United States Patent
Shikanai et al.

(10) Patent No.: US 10,483,743 B2
(45) Date of Patent: Nov. 19, 2019

(54) CABLE HOLDING DEVICE

(71) Applicant: Panasonic Intellectual Property Management Co., Ltd., Osaka (JP)

(72) Inventors: Masaki Shikanai, Kanagawa (JP); Shogo Mikami, Miyagi (JP); Yoshinari Matsuyama, Osaka (JP); Tomohiro Sekiguchi, Kanagawa (JP); Takeshi Kikuchi, Osaka (JP); Tomomi Nishikata, Ishikawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/373,815

(22) Filed: Apr. 3, 2019

(65) Prior Publication Data

US 2019/0229510 A1 Jul. 25, 2019

Related U.S. Application Data

(63) Continuation of application No. PCT/JP2017/033803, filed on Sep. 20, 2017.

(30) Foreign Application Priority Data

Oct. 6, 2016 (JP) .................. 2016-198389

(51) Int. Cl.
*H02G 3/22* (2006.01)

(52) U.S. Cl.
CPC ..................... *H02G 3/22* (2013.01)

(58) Field of Classification Search
CPC ....................................................... H02G 3/22
USPC ........................................................ 174/652
See application file for complete search history.

(56) References Cited

U.S. PATENT DOCUMENTS

| 5,235,138 A * | 8/1993 | Shah ........................ H02G 3/22 138/89 |
| 6,150,608 A * | 11/2000 | Wambeke ............ G02B 6/4428 16/2.1 |
| 2009/0057008 A1 * | 3/2009 | Knorr .................. G02B 6/4444 174/652 |

(Continued)

FOREIGN PATENT DOCUMENTS

| JP | 08-161878 | 6/1996 |
| JP | 2000-214335 | 8/2000 |
| JP | 2011-076928 | 4/2011 |

(Continued)

OTHER PUBLICATIONS

International Search Report dated Oct. 24, 2017 in International (PCT) Application No. PCT/JP2017/033803.

*Primary Examiner* — Stanley Tso
(74) *Attorney, Agent, or Firm* — Wenderoth, Lind & Ponack, L.L.P.

(57) ABSTRACT

A cable holding device for holding a cable, includes a first member, a second member and a fixing member. The first member has a first through hole through which the cable is to pass. The second member has a second through hole through which the cable is to pass. The fixing member fixes the second member to the first member in such a condition that the second through hole partially overlaps the first through hole to hold the cable by an inner periphery of the first through hole and an inner periphery of the second through hole.

5 Claims, 13 Drawing Sheets

(56) References Cited

U.S. PATENT DOCUMENTS

2014/0131092 A1* 5/2014 Liu ..................... H02G 3/045
                                                  174/652
2015/0136472 A1* 5/2015 Hanby ................ H02G 15/013
                                                  174/652

FOREIGN PATENT DOCUMENTS

| JP | 2012-176102 | 9/2012 |
| JP | 2014-168364 | 9/2014 |
| JP | 2015-220805 | 12/2015 |

* cited by examiner

CABLE HOLDING DEVICE

BACKGROUND

1. Technical Field

The present disclosure relates to a cable holding device for holding a cable.

2. Description of the Related Art

Such a cable holding device has heretofore been known that is used to hold cables as disclosed, for example, in PTL 1. The cable holding device disclosed in PTL 1 holds the cables so as to restrict a movement of each cable in the radial directions of the cable (the directions perpendicular to the extending direction of the cable).

CITATION LIST

Patent Literature

PTL 1: Unexamined Japanese Patent Publication No. 2000-214335

SUMMARY

It is sometimes required to restrict a movement of the cable not only in the radial directions of the cable, but also in the extending direction of the cable.

Therefore, an object of the present disclosure is to hold a cable such that a movement of the cable is restricted in both a radial direction and an extending direction of the cable.

To solve the above-mentioned technical problem, the present disclosure provides, in an aspect, a cable holding device for holding a cable, includes a first member, a second member and a fixing member. The first member has a first through hole through which the cable is to pass. The second member has a second through hole through which the cable is to pass. The fixing member fixes the second member to the first member in such a condition that the second through hole partially overlaps the first through hole to hold the cable by an inner periphery of the first through hole and an inner periphery of the second through hole.

According to the present disclosure, it is possible to hold a cable, while restricting a movement of the cable in both a radial direction and an extending direction of the cable.

DETAILED DESCRIPTION

Figure 1:
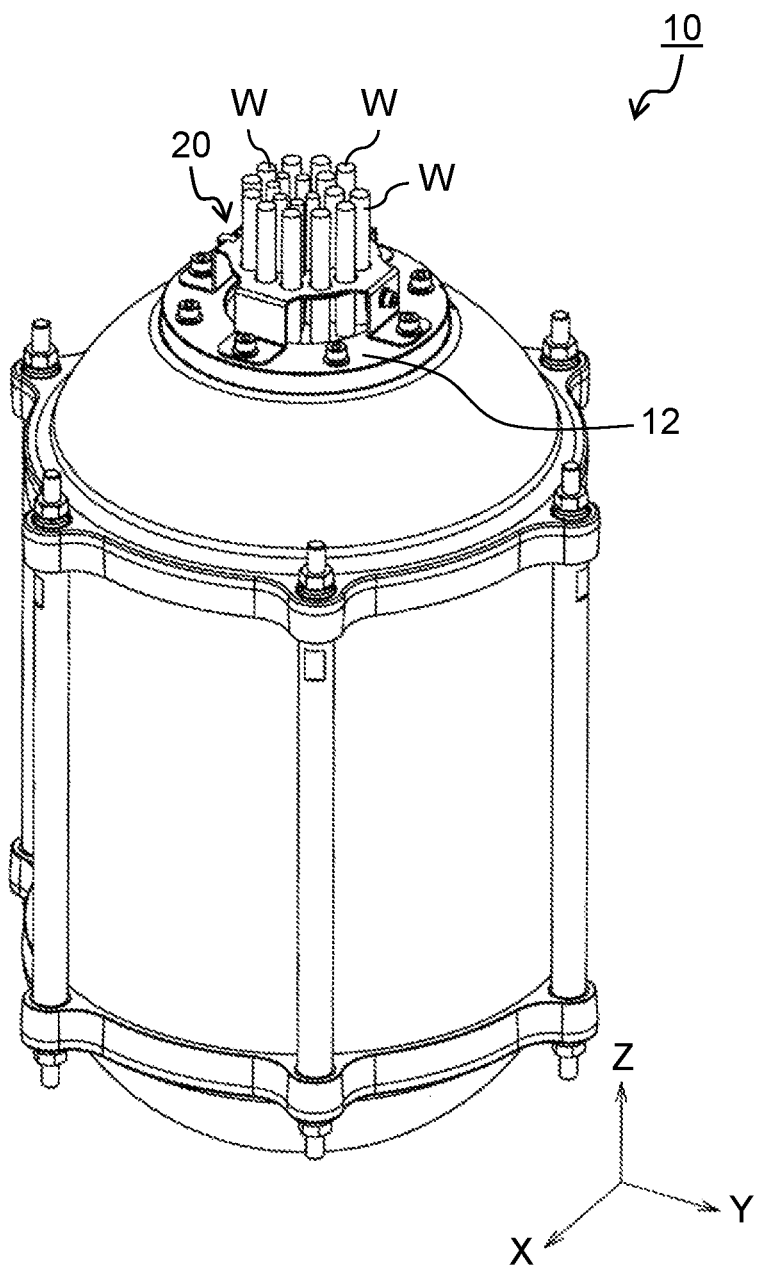
FIG. 1 is a perspective view of a pressure-tight case which has a cable holding device in accordance with an exemplary embodiment of the present disclosure.

A cable holding device in an aspect of the present disclosure is a cable holding device for holding a cable, and comprises: a first member that has a first through hole through which the cable is to pass; a second member that has a second through hole through which the cable is to pass; and a fixing member that fixes the second member to the first member in such a condition that the second through hole partially overlaps the first through hole to hold the cable by an inner periphery of the first through hole and an inner periphery of the second through hole.

According to this configuration, it is possible to hold a cable, while restricting a movement of the cable in both a radial direction and an extending direction of the cable.

For example, the second member may be supported on the first member so as to be movable in a direction crossing a penetrating direction of the first through hole. This makes it possible to hold a cable or to release the holding of the cable.

As another configuration, the second member may be supported on the first member so as to be movable in the penetrating direction of the first through hole. This makes it possible to hold a cable or to release the holding of the cable.

For example, the fixing member may be a fixing screw, and the second member may be moved relative to the first member by a rotation of the fixing screw. In a case where the first member has a screw through hole through which the fixing screw is to pass, the second member has a female threaded hole which engages with the fixing screw. In a case where the second member has a screw through hole through which the fixing screw is to pass, the first member has a female threaded hole which engages with the fixing screw. The cable can be easily held by rotating the fixing screw.

For example, each of opening edges at both ends of the first through hole and at both ends of the second through hole may have a chamfered portion. This makes it possible to hold the cable without scratching the cable or without causing a slip of the cable.

For example, a plurality of first through holes may be formed on the first member, and the same number of second through holes as the number of the first through holes may be formed on the second member. This makes it possible to hold a plurality of cables, while restricting a movement of each cable in both a radial direction and an extending direction of the cable.

Hereinafter, exemplary embodiments will be described with reference to the accompanying drawings as appropriate. However, unnecessarily detailed description may occasionally be omitted. For example, detailed description of well-known matters and redundant description of substantially the same configuration may occasionally be omitted. This is to avoid the following description from becoming unnecessarily redundant, and to allow any person skilled in the art to easily understand the description.

Also, it should be noted that the following description and the accompanying drawings are provided by the inventors to allow any person skilled in the art to fully understand the present disclosure, and that it is not intended to limit the subject matter described in the claims by the following description.

FIG. 1 shows a pressure-tight case which has a cable holding device in accordance with an exemplary embodiment of the present disclosure. The XYZ orthogonal coordinate system shown in the figure is for helping better understanding of the present disclosure and is not intended to limit the present disclosure. The X-axis direction, Y-axis direction and Z-axis direction are perpendicular to one another. The X-axis direction indicates a depth direction of the pressure-tight case, the Y-axis direction indicates a width direction of the pressure-tight case, and the Z-axis direction indicates a height direction of the pressure-tight case.

Pressure-tight case 10 shown in FIG. 1 is a case which is used, for example, under water, and encloses inside thereof a device which is driven by receiving electric power and a device which is driven by communicating with an external device. A plurality of cables W are extending from the devices in pressure-tight case 10 toward the outside of pressure-tight case 10. The plurality of cables W are flexible cables including, for example, power cables for supplying electric power and coaxial cables for exchanging signals.

The plurality of cables W penetrate end plate 12 which is a part of pressure-tight case 10 for separating the outside and the inside of pressure-tight case 10 and is mounted on an end of pressure-tight case 10 in the height direction of pressure-tight case 10 (the Z-axis direction). Cable holding device 20 is mounted on end plate 12 to hold cables W. Details of cable holding device 20 will be described later.

Figure 2:
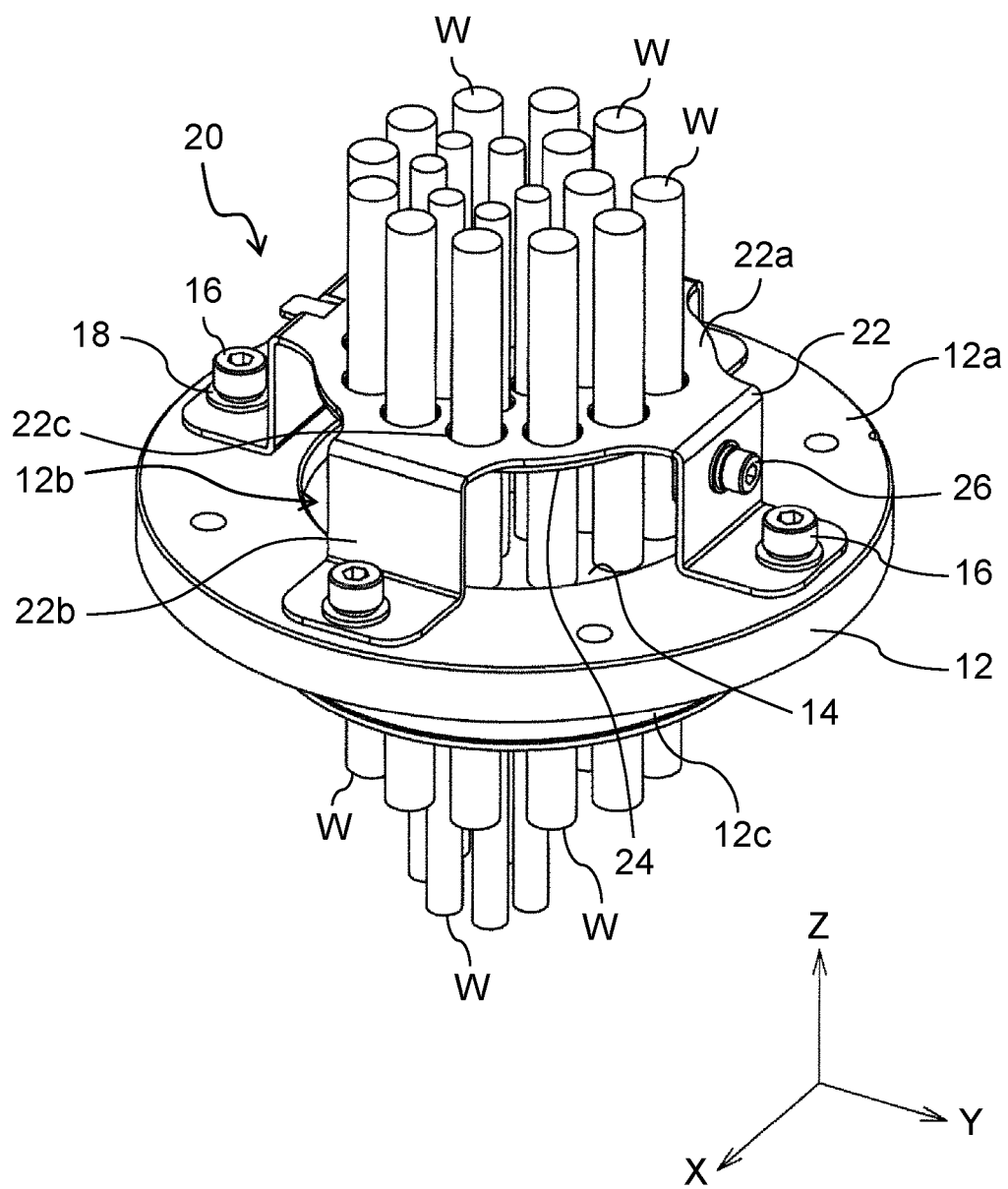
FIG. 2 is a perspective view of an end plate of the pressure-tight case on which the cable holding device in accordance with the exemplary embodiment is mounted.
Figure 3:
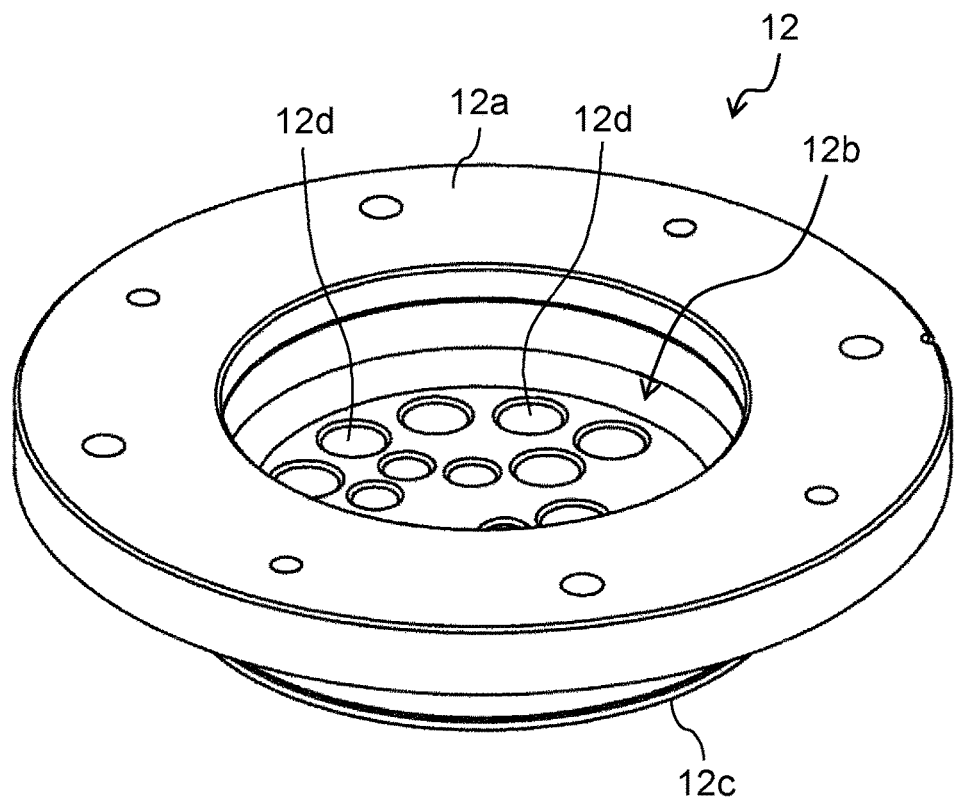
FIG. 3 is a perspective view of the end plate of the pressure-tight case.

FIG. 2 shows end plate 12 of pressure-tight case 10 which is provided with a cable holding device in accordance with the present exemplary embodiment. FIG. 3 shows end plate 12 alone.

As shown in FIGS. 2 and 3, end plate 12 is a disk-shaped member made of a metallic material and has recessed portion 12b at the center of outer surface 12a and protruded portion 12c protruded toward the inside of pressure-tight case 10. Further, a plurality of cable through holes 12d are formed on end plate 12 so as to penetrate from the bottom surface of recessed portion 12b to the top surface of protruded portion 12c (i.e., penetrate in the Z-axis direction). The plurality of cables W respectively pass through the plurality of cable through holes 12d.

The plurality of cables W in the state of passing through cable through holes 12d are fixed to end plate 12 with adhesive 14 as shown in FIG. 2.

Figure 4:
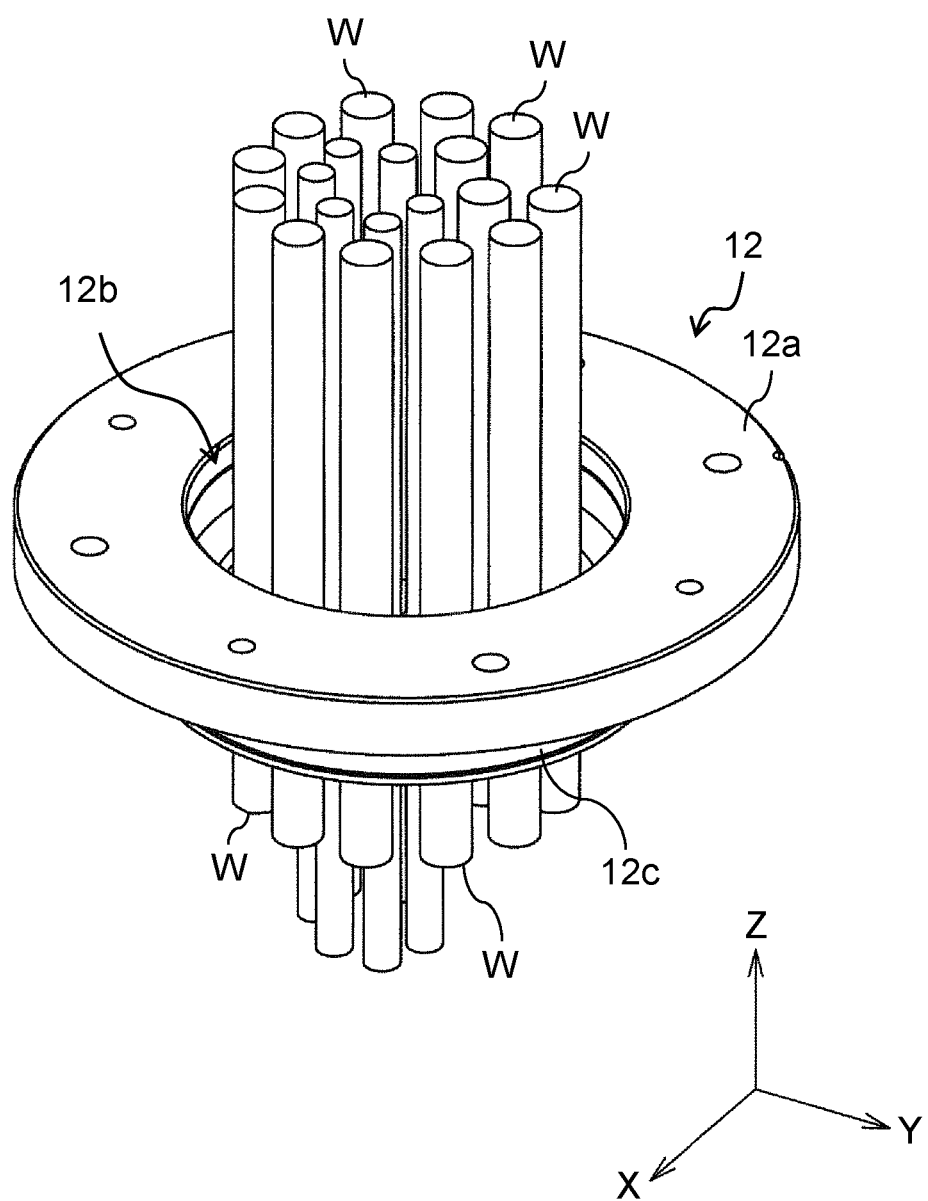
FIG. 4 is a perspective view of the end plate of the pressure-tight case in a state in which cables are passing through the end plate.

Specifically, first, cables W are respectively inserted into the plurality of cable through holes 12d on end plate 12 as shown in FIG. 4. While this state is maintained, liquid adhesive 14 is flown into recessed portion 12b of end plate 12. Adhesive 14 may, for example, be a two-component room temperature curing epoxy adhesive or an industrial-use epoxy adhesive. Particularly in the case of the present exemplary embodiment, since pressure-tight case 10 is used under water, adhesive 14 is an adhesive that is usable under water.

Figure 5:
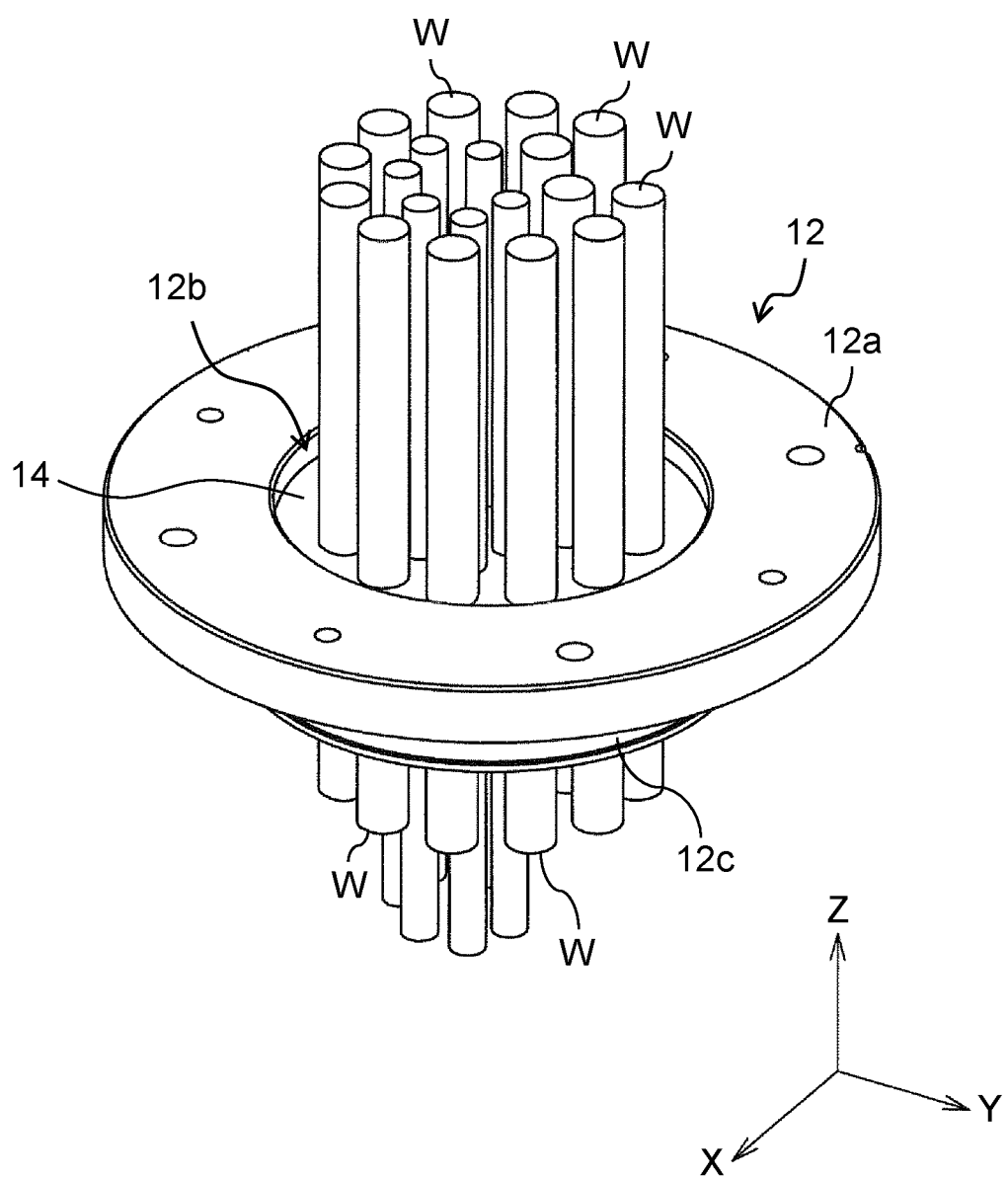
FIG. 5 is a perspective view of the end plate of the pressure-tight case in a state in which the cables are fixed with an adhesive.
Figure 6:
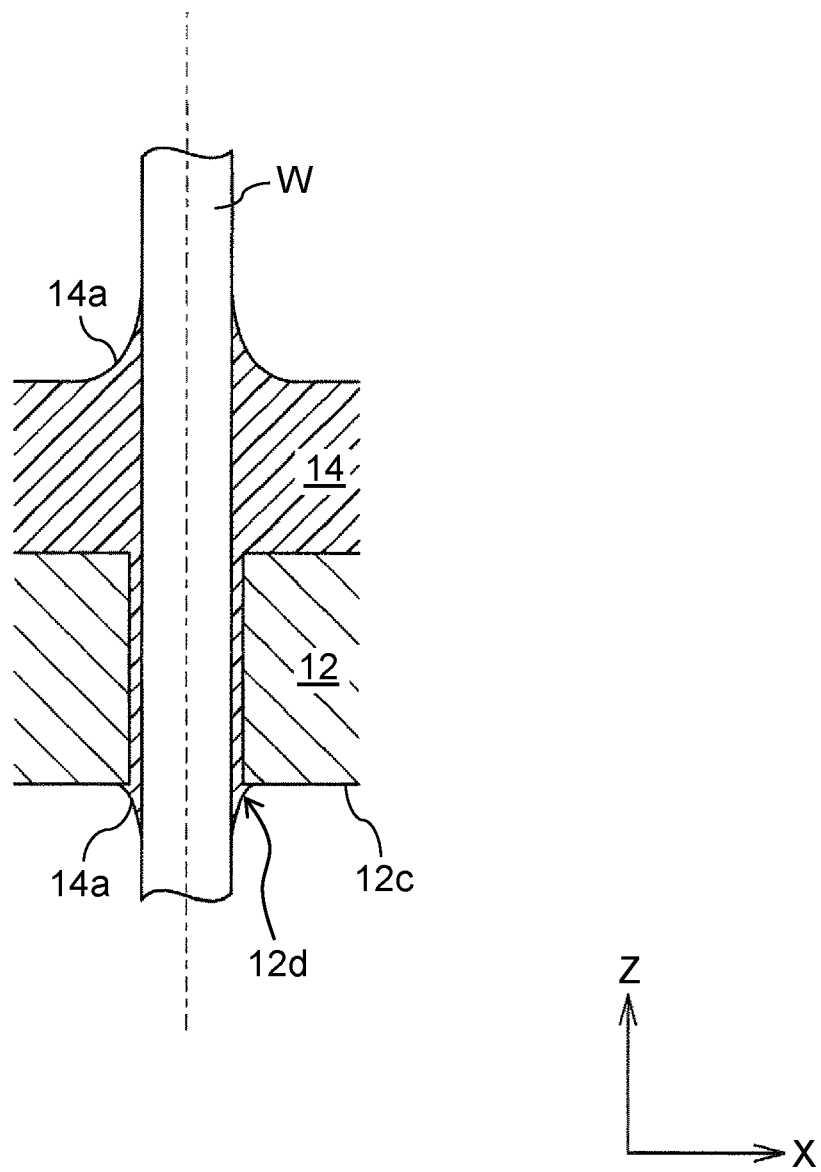
FIG. 6 is a sectional view showing a state in which the cables are fixed to the end plate.

When adhesive 14 in recessed portion 12b of end plate 12 has cured, the plurality of cables W are fixed to end plate 12 as shown in FIG. 5. Adhesive 14 also fills the gap between cable through hole 12d and cable W as shown in FIG. 6, which is a partial sectional view of end plate 12. For example, the space on the protruded portion 12c side of end plate 12 may be made to be a negative pressure to draw adhesive 14 in recessed portion 12b into cable through hole 12d, so that adhesive 14 fills the gap between cable through hole 12d and cable W. When adhesive 14 in cable through hole 12d has cured, the gap between cable through hole 12d and cable W is watertight sealed. Here, it is preferable to form fillet 14a of adhesive 14 by reciprocally moving cable W in the extending direction (the Z-axis direction) relative to cable through hole 12d before adhesive 14 cures. This prevents generation of a gap at the boundary between adhesive 14 and cable W.

Cable holding device 20 is provided on end plate 12 to hold the plurality of cables W which are fixed to end plate 12 with adhesive 14 as shown in FIG. 2.

Figure 7:
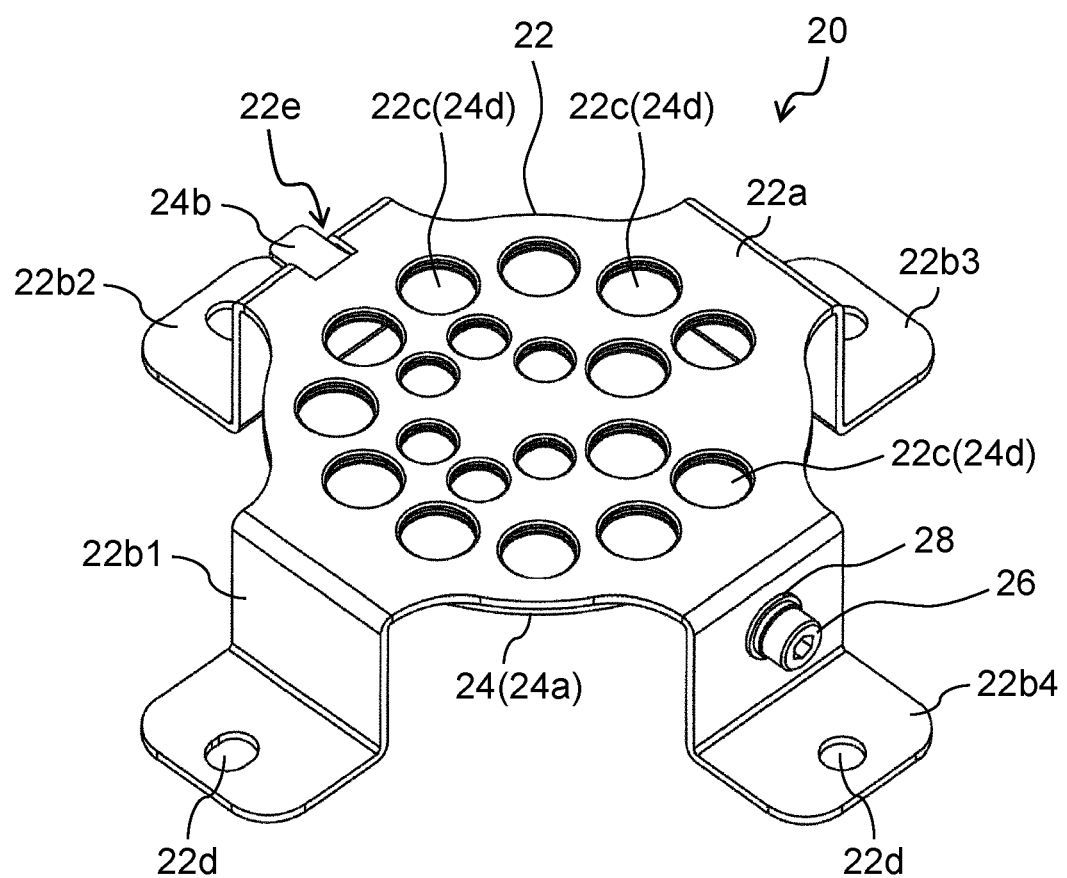
FIG. 7 is a perspective view of the cable holding device in a cable releasing state in accordance with the exemplary embodiment.
Figure 8:
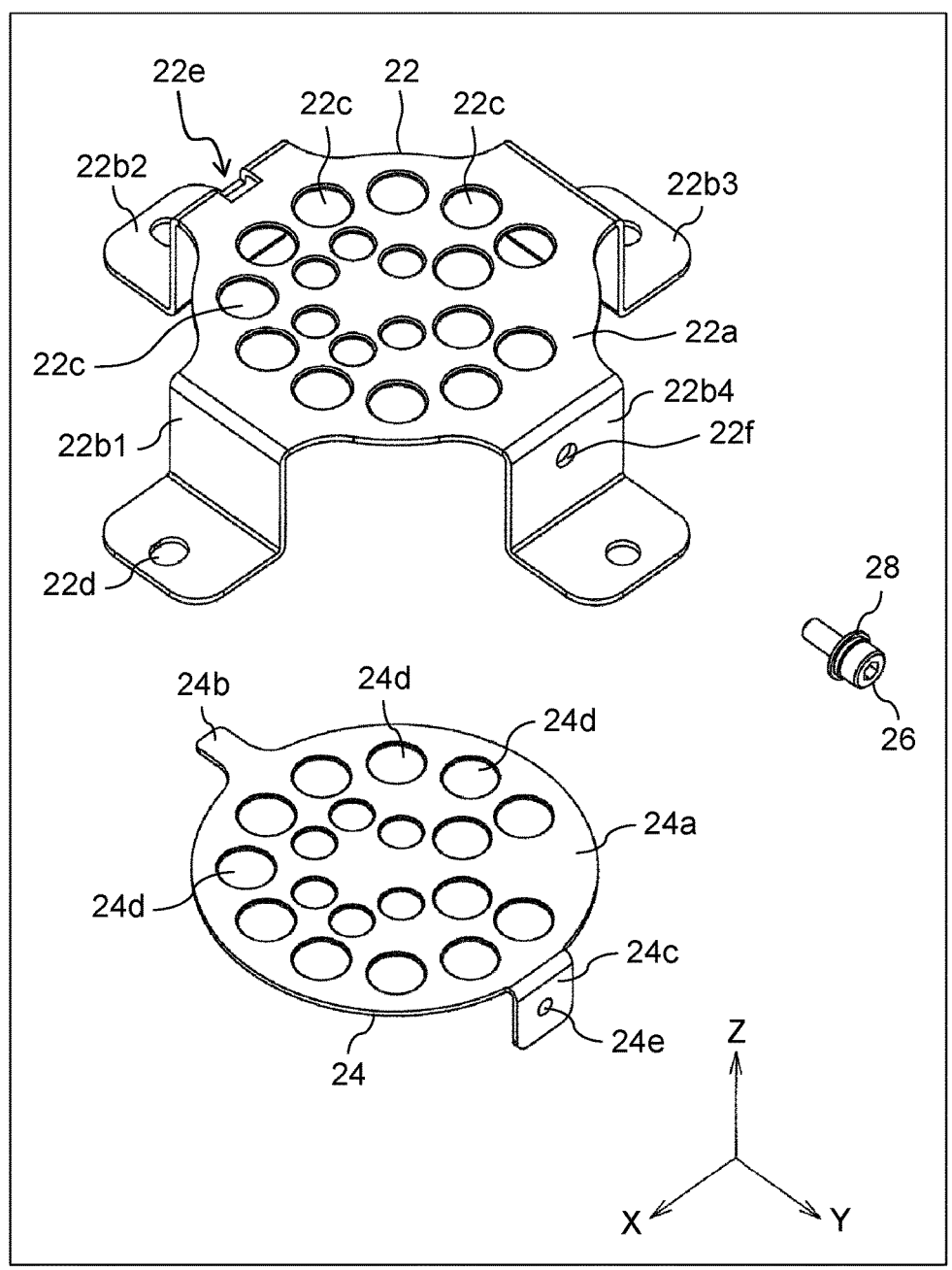
FIG. 8 is an exploded view of the cable holding device in accordance with the exemplary embodiment.

FIG. 7 is a perspective view of the cable holding device and FIG. 8 is an exploded view of the cable holding device.

Cable holding device 20 in accordance with the present exemplary embodiment shown in FIGS. 7 and 8 is configured to hold the plurality of cables W fixed to end plate 12 with adhesive 14 such that the plurality of cables W do not fluctuate.

Explaining specifically, repetitive fluctuations of cable W at a part other than the part fixed to end plate 12 with adhesive 14 may possibly cause the adhesive force between adhesive 14 and cable W to gradually decrease, so that a gap may eventually be generated between adhesive 14 and cable W. In the case of the present exemplary embodiment, there is a possibility that a gap would be generated between adhesive 14 and cable W and that liquid would penetrate inside pressure-tight case 10 through the gap. To prevent this problem, cable holding device 20 holds the plurality of cables W so that cables W do not fluctuate.

For this purpose, cable holding device 20 has base member 22 (a first member), slide member 24 (a second member) that is movably supported on base member 22, and fixing screw 26 (a fixing member) for fixing slide member 24 to base member 22.

Base member 22 of cable holding device 20 is produced by, for example, a sheet-metal processing of a metal thin plate. Base member 22 has top plate 22a, and four legs 22b1 to 22b4 which extend from the outer periphery of top plate 22a in a thickness direction of top plate 22a (the Z-axis direction). In the present exemplary embodiment, four legs 22b1 to 22b4 are disposed at positions dividing the outer periphery of top plate 22a into approximately quarters, i.e., two legs in the X-axis directions and two legs in the Y-axis directions. Each of four legs 22b1 to 22b4 is formed in a letter-L shape so as to have a portion which extends from the outer periphery of top plate 22a in the −Z-axis direction and a portion which is approximately parallel to the XY plane to oppose to end plate 12. Bolt through hole 22d is formed at the portion opposing to end plate 12. Further, guide hole 22e is formed on leg 22b2 on the −Y-direction side, and screw through hole 22f is formed on leg 22b4 on the +Y-direction side.

Top plate 22a of base member 22 of cable holding device 20 is approximately circular in shape and has a plurality of through holes 22c (a first through hole) which penetrate top plate 22a in the thickness direction of top plate 22a (the Z-axis direction) and through which cables W are to respectively pass. The plurality of through holes 22c have different sizes respectively corresponding to the plurality of kinds of cables W which have different outer diameters from one another as shown in FIGS. 7 and 8. The layout of the plurality of through holes 22c is the same as the layout of the plurality of cable through holes 12d formed on end plate 12 of pressure-tight case 10 shown in FIG. 3. Consequently, each cable W can pass through a through hole 22c on base member 22 and a cable through hole 12d on end plate 12 which oppose to each other in the height direction (the Z-axis direction) without being largely twisted.

Four legs 22b1 to 22b4 of base member 22 serve as brackets for fixing base member 22 to end plate 12 of pressure-tight case 10 as shown in FIG. 2. Specifically, legs 22b1 to 22b4 are configured so that top plate 22a of base member 22 is disposed above recessed portion 12b of end plate 12. In the case of the present exemplary embodiment, each of legs 22b1 to 22b4 of base member 22 is fixed to end plate 12 with bolt 16 and spring washer 18. Bolt through hole 22d through which the shank of bolt 16 is to pass is formed on each of legs 22b1 to 22b4 as shown in FIG. 7.

Slide member 24 of cable holding device 20 is produced by, for example, a sheet-metal processing of a metal thin plate as shown in FIG. 8. Slide member 24 has disk portion 24a, guide tab 24b for guiding slide member 24, and slide lever 24c for sliding slide member 24.

Disk portion 24a of slide member 24 is made smaller in size than top plate 22a of base member 22 as shown in FIG. 7. Accordingly, disk portion 24a can overlap the back surface (the surface opposing to end plate 12 of pressure-tight case 10) of top plate 22a without interfering with legs 22b1 to 22b4 of base member 22.

Also, disk portion 24a of slide member 24 has a plurality of through holes 24d (a second through hole) through which cables W are to respectively penetrate or pass in the thickness direction of disk portion 24a (the Z-axis direction) as shown in FIG. 8. The layout of through holes 24d on disk portion 24a is the same as the layout of through holes 22c on top plate 22a of base member 22. Consequently, each of through holes 24d on slide member 24 can overlap a corresponding one of through holes 22c on base member 22 so as to allow a cable W to pass through the overlapping through holes 24d and 22c as shown in FIG. 7.

In the case of the present exemplary embodiment, each of respective openings of a through hole 22c on base member 22 and a through hole 24d on slide member 24 through which a single cable W passes have an identical circular shape which is slightly larger than the cross-section of the cable W. Accordingly, the cable W can pass through both of the two through holes 22c and 24d when the contours of their openings overlap each other, or the centers of the openings overlap each other, as shown in FIG. 7.

Guide tab 24b of slide member 24 is a part for guiding slide member 24 to slide in a sliding direction (the Y-axis direction) crossing the penetrating direction of through holes 22c on base member 22 (the Z-axis direction) as shown in FIG. 8. The sliding direction is a radial direction of disk portion 24a of slide member 24.

Specifically, guide tab 24b is a tongue-piece-like part projecting outward in the sliding direction, or in a radial direction of disk portion 24a (the Z-axis direction), from the outer periphery of disk portion 24a as shown in FIG. 8. Guide hole 22e which engages with guide tab 24b to guide the guide tab 24b in the sliding direction is formed on base member 22. Guide hole 22e is penetrating one leg 22b2 in the sliding direction. Accordingly, engagement of guide tab 24b with guide hole 22e allows slide member 24 to be guided to move in the sliding direction below top plate 22a of base member 22 as shown in FIG. 7.

Slide lever 24c of slide member 24 is a part for causing slide member 24 to slide as shown in FIG. 8.

Figure 9:
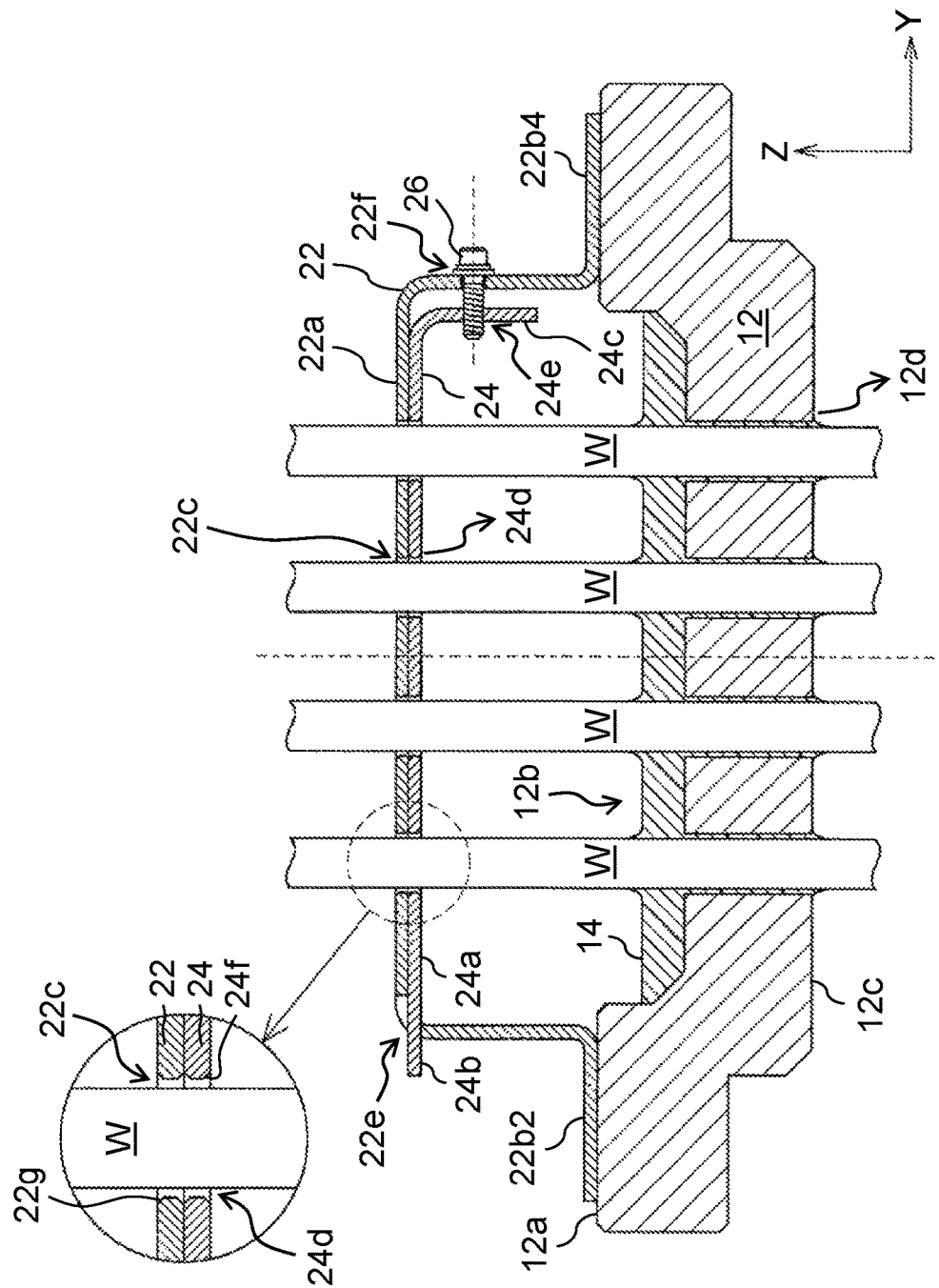
FIG. 9 is a sectional view of the cable holding device in the cable releasing state in accordance with the exemplary embodiment.

Specifically, slide lever 24c is a part which extends in the thickness direction of disk portion 24a (the Z-axis direction) from a part of the outer periphery of disk portion 24a opposite to guide tab 24b. As shown in FIG. 9, which is a sectional view of cable holding device 20, slide lever 24c opposes in the sliding direction (the Y-axis direction) to leg 22b4, which is opposite to leg 22b2 on which guide hole 22e is formed.

Also, female threaded hole 24e is formed on slide lever 24c so as to penetrate slide lever 24c in the sliding direction (the Y-axis direction) as shown in FIG. 8. Screw through hole 22f is formed on leg 22b4 of base member 22 at a position opposing to female threaded hole 24e.

Fixing screw 26 engages with (is screwed into) female threaded hole 24e of slide lever 24. Specifically, fixing screw 26 passes through spring washer 28 and screw through hole 22f of base member 22 and engages with female threaded hole 24e. This engagement and the engagement of guide tab 24b with guide hole 22e allow slide member 24 to be supported on base member 22.

Fixing screw 26 may be rotated to cause slide member 24 to slide (parallelly move) in the sliding direction (the Y-axis direction) relative to base member 22 between a "cable clamp releasing position" and a "cable clamping position" and to be fixed at either one of these positions.

The "cable clamp releasing position" is a position of slide member 24 relative to base member 22 at which a through hole 22c on base member 22 and a through hole 24d on slide member 24 are in a state of overlapping each other so that a cable W can pass through both the through hole 22c and the through hole 24d as shown in FIGS. 7 and 9. In the case of the present exemplary embodiment, in which the openings of a through hole 22c and a through hole 24d through which a single cable W passes are the same in shape as each other, the "cable clamp releasing position" is a position at which approximately a whole of the through hole 24d overlaps the through hole 22c when viewed in the extending direction of the part of the cable W passing through the through holes 22c and 24d (the Z-axis direction in FIG. 9).

Figure 10:
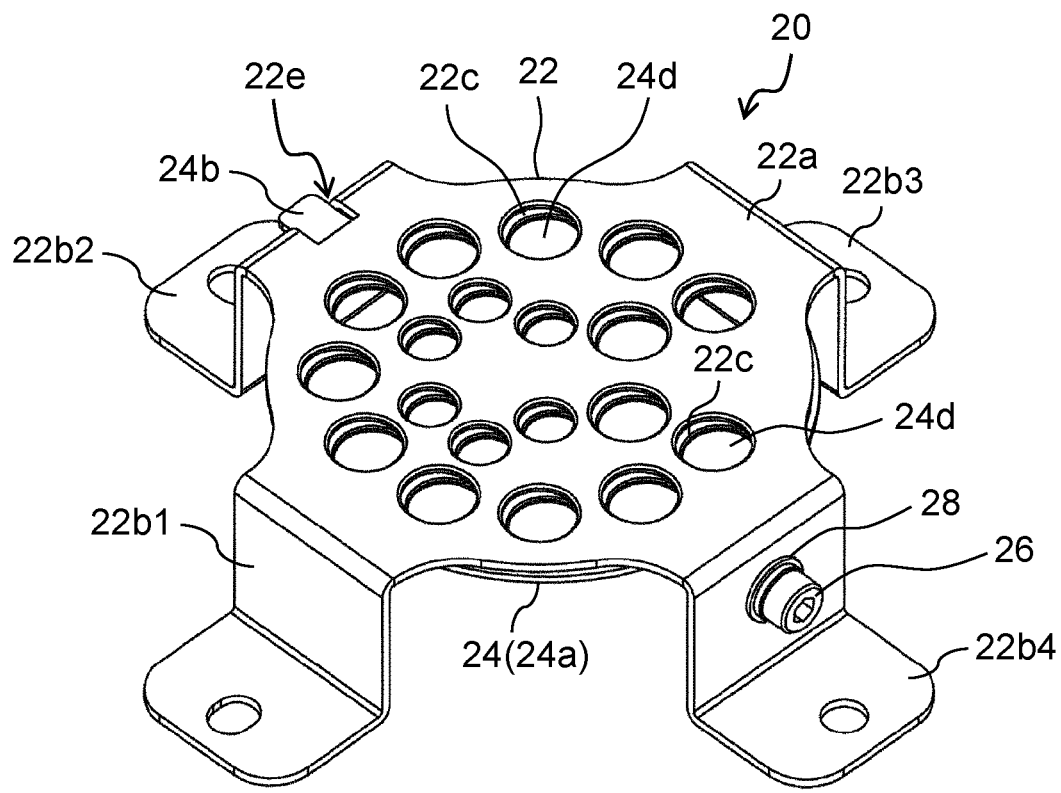
FIG. 10 is a perspective view of the cable holding device in a cable holding state in accordance with the exemplary embodiment.
Figure 11:
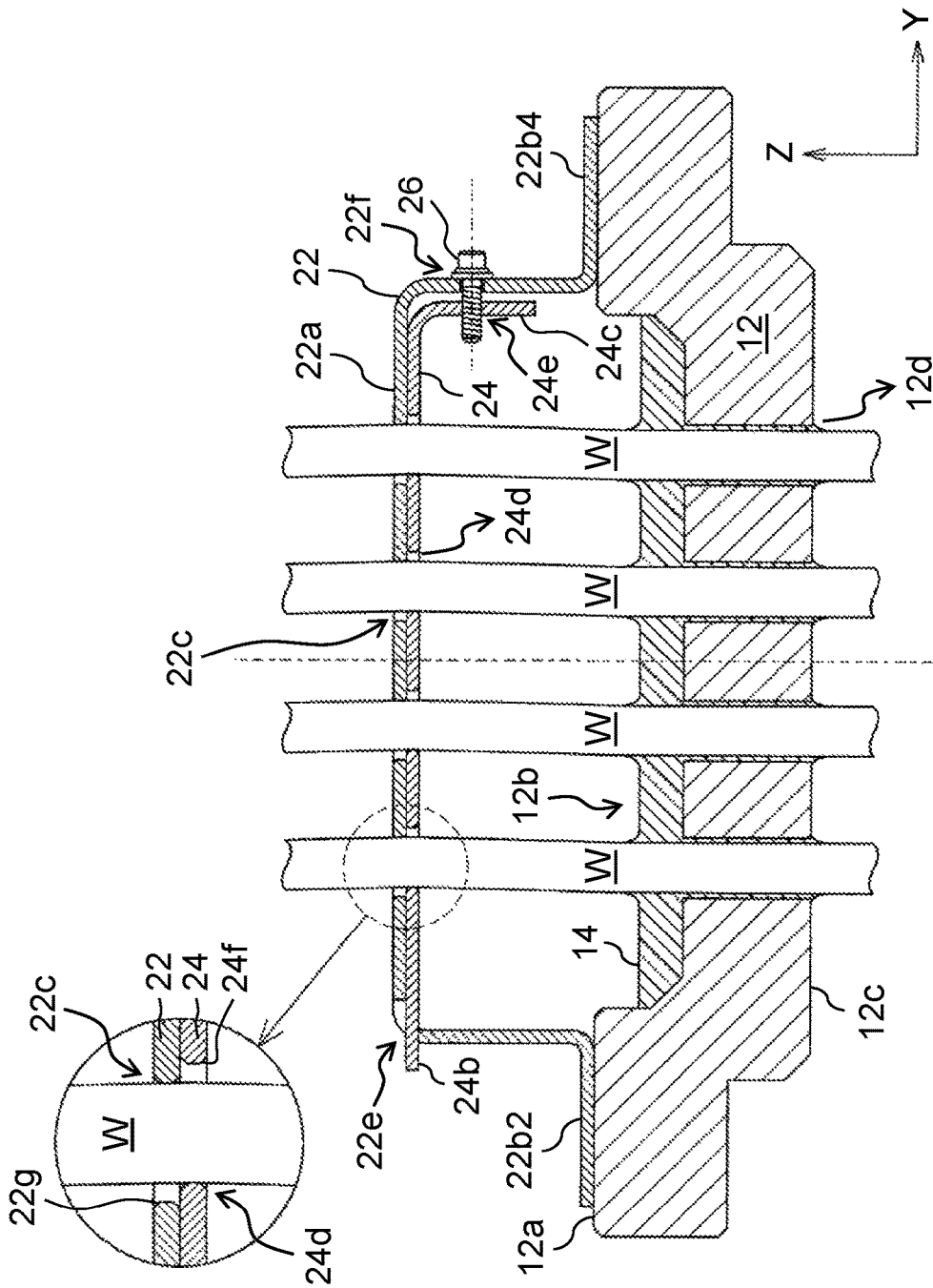
FIG. 11 is a sectional view of the cable holding device in the cable holding state in accordance with the exemplary embodiment.

FIGS. 10 and 11 respectively show a sectional view and a perspective view of cable holding device 20 in a state of holding cables W, or in a state in which slide member 24 is fixed at the "cable clamping position".

When cable holding device 20 holds cables W, through holes 24d on slide member 24 are shifted in the sliding direction (the Y-axis direction) relative to through holds 22c on base member 22 as shown in FIGS. 10 and 11. In other words, a through hole 24d partially overlaps a through hole 22c when viewed in the extending direction of a part of a cable W passing through the through holes 22c and 24d (the Z-axis direction in FIGS. 10 and 11).

Specifically, sliding of slide member 24 in the sliding direction (the Y-axis direction) relative to base member 22 by an appropriate amount of deviation from the "cable clamp releasing position" causes a through hole 24d on slide member 24 to overlap a through hole 22c on base member 22 by an appropriate overlapping amount. This causes an inner periphery such as an inner surface and an opening edge of one through hole 22c to come in contact with a cable W as shown in FIG. 11. At the same time, an inner periphery such as an inner surface and an opening edge of the other through hole 24*d* comes in contact with the cable W in the opposite direction (the positive Y-axis direction) to the direction in which the one through hole 22*c* is in contact with the cable W (the negative Y-axis direction).

As a result, the cable W passing through these through holes 22*c* and 24*d* is clamped by the inner periphery of the through hole 22*c* and the inner periphery of the through hole 24*d* in an approximately radial direction of the cable W (approximately the Y-axis direction) with a clamping force corresponding to the overlapping amount of the through hole 24*d*.

This will be supplemented below. Through holes 22*c* and through holes 24*d* do not strictly oppose to each other in the sliding direction of slide member 24 (the Y-axis direction). The reason for this is that through holes 22*c* are formed on base member 22 and through holes 24*d* are formed on slide member 24, which overlaps base member 22. Therefore, the inner periphery of one through hole 22*c* and the inner periphery of the other through hole 24*d*, which clamp a cable W, do not strictly oppose to each other in the Y-axis direction. Accordingly, the cable W is clamped approximately in its radial direction (approximately the Y-axis direction) by these peripheries. The cable W is clamped in a direction closer to the Y-axis direction as the distance between base member 22 and slide member 24 becomes narrower. Even if base member 22 and slide member 24 are apart from each other, the cable W can be clamped in a direction containing a sliding direction component (a Y-axis direction component) so as not to slip out of the through holes.

The cable W clamped in this manner is held by cable holding device 20 so that its movement is restricted in both a radial direction (the X-axis direction, the Y-axis direction) and an extending direction (the Z-axis direction).

Accordingly, in the case of the present exemplary embodiment, clamping of a cable W can be released (i.e., the cable W can be released) when approximately a whole of a through hole 24*d* on slide member 24 overlaps a through hole 22*c* on base member 22. When the through hole 24*d* on slide member 24 overlaps the through hole 22*c* on base member 22 by an overlapping amount smaller than a specified overlapping amount, the cable W is held so as not to slip out of the through holes.

The opening edge at each of both ends of each through hole 22*c* on base member 22 may be provided with chamfered portion 22*g* as shown in FIG. 11 depending on the kind of the cable W so that the cable W is not scratched when it is held and so that the cable W can be held without slipping. Similarly, the opening edge at each of both ends of each through hole 24*d* on slide member 24 may be provided with chamfered portion 24*f*. This allows cable holding device 20 to hold cables W without scratching cables W and without causing slips of cables W.

Further, according to the cable holding device of the present exemplary embodiment configured like this, a plurality of cables W can be simultaneously held by a single action.

Further, cable holding device 20 can be used to form fillets 14*a* of adhesive 14 as described above and as shown in FIG. 6. For example, a plurality of cables W are held with cable holding device 20 which is in a state not being fixed to end plate 12 before adhesive 14 cures. Cable holding device 20 may be reciprocally moved in the extending direction of cables W after holding the plurality of cables W to allow the plurality of cables W to simultaneously reciprocate. As a result, a similarly-shaped fillet 14*a* of adhesive 14 can be formed on each of the plurality of cables W. After adhesive 14 has cured, cable holding device 20 may be returned to the cable releasing state and fixed to end plate 12. After fixing cable holding device 20 to end plate 12, the plurality of cables W may be held again by the fixed cable holding device 20.

According to the present exemplary embodiment as described above, cables W can be held so that a movement of each cable W is restricted in both a radial direction and an extending direction of the cable W.

Incidentally, exemplary embodiments of the present disclosure are not limited to the above-described exemplary embodiment.

For example, although cable holding device 20 in the above-described exemplary embodiment holds a plurality of cables W, it may instead hold a single cable.

Also, in the above-described exemplary embodiment, slide member 24 is mounted directly to base member 22 as shown in FIG. 7. As a substitution, slide member 24 may be mounted to base member 22 through another member. In other words, the slide member may be fixed relative to the base member either directly or indirectly to hold cable W.

Also, although slide member 24 is disposed on the −Z-axis direction side of base member 22 in cable holding device 20, the slide member may be disposed above the base member (on the +Z-axis side). In this case, the guide hole of the base member and the guide tab of the slide member may be configured to have such shapes that allow them to engage with each other. Also, a female threaded hole may be provided at a part corresponding to screw through hole 22*f* of base member 22 and a screw through hole is provided at a part corresponding to female threaded hole 24*e* of slide member 24 in cable holding device 20, so that the slide member can slide relative to the base member in the direction crossing the penetrating direction of the through holes (the Y-axis direction) by a rotation of the fixing screw.

Further, in the above-described exemplary embodiment, an opening of each through hole 22*c* on base member 22 and an opening of a corresponding through hole 24*d* on slide member 24 in cable holding device 20 have the same circular shapes as each other as shown in FIG. 8. However, exemplary embodiments of the present disclosure are not limited to this configuration. The opening of each of the through holes on the base member and each of the through holes on the slide member may, for example, be elliptical, rhomboidal or rectangular. Also, an opening of a through hole on the base member and an opening of a corresponding through hole on the slide member through which a single cable W passes may have different shapes from each other. In other words, the opening shapes of the through holes may not be limited as far as a cable can be clamped with the inner peripheries of the through holes.

Furthermore, in the above-described exemplary embodiment, approximately the whole of each through hole 24*d* on slide member 24 overlaps a corresponding through hole 22*c* on base member 22 when cable holding device 20 is releasing cables W as shown in FIGS. 7 and 9. However, exemplary embodiments of the present disclosure are not limited to this configuration. A part of a through hole on the slide member may overlap a corresponding through hole on the base member as far as the cable can be released. In this case, the through hole on the slide member may overlap the through hole on the base member by a first overlapping amount when the cable holding device is holding the cable. On the other hand, the through hole on the slide member may overlap the through hole on the base member by a second overlapping amount which is larger than the first overlapping amount when the cable holding device is releasing the cable.

Additionally, in the above-described exemplary embodiment, cable holding device 20 has base member 22 and slide member 24 which are respectively provided with through holes 22c and 24d penetrating the respective members in the same direction (the Z-axis direction), and slide member 24 is supported on base member 22 so as to be slidable in the sliding direction (the Y-axis direction) crossing the penetrating direction of through hole 22c on base member 22. However, exemplary embodiments of the present disclosure are not limited to this configuration.

Figure 12A:
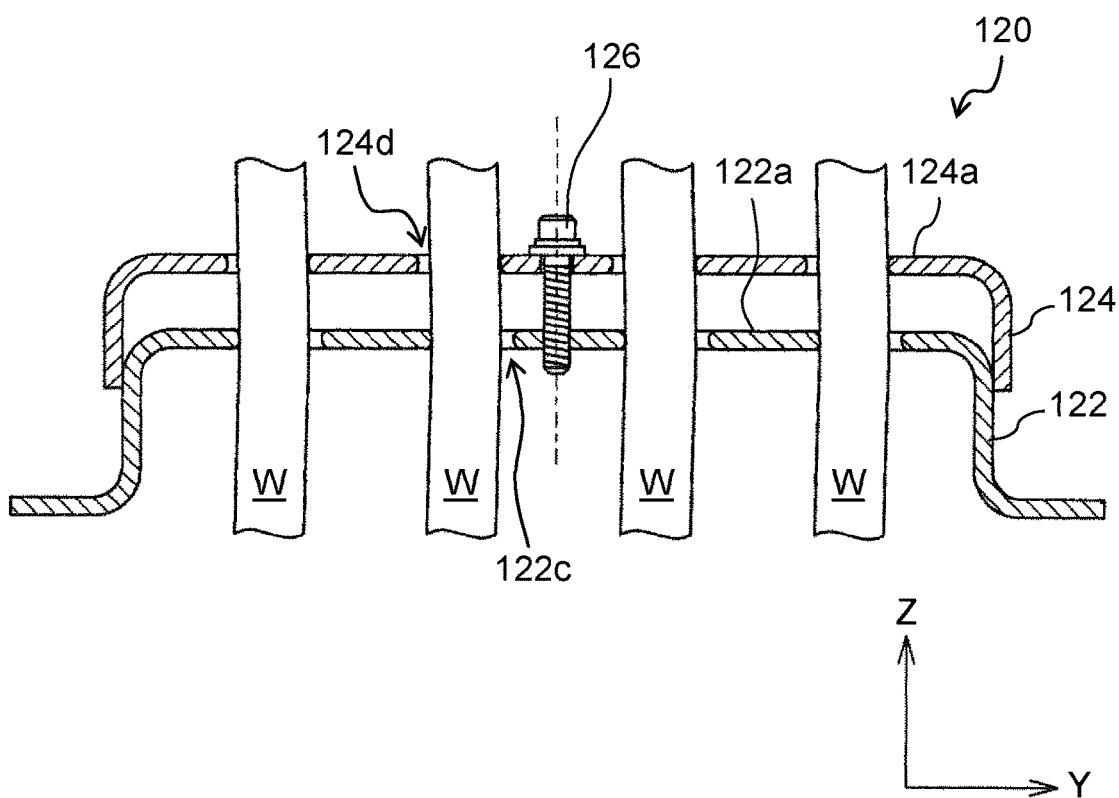
FIG. 12A is a sectional view of a cable holding device in a cable releasing state in accordance with another exemplary embodiment.
Figure 12B:
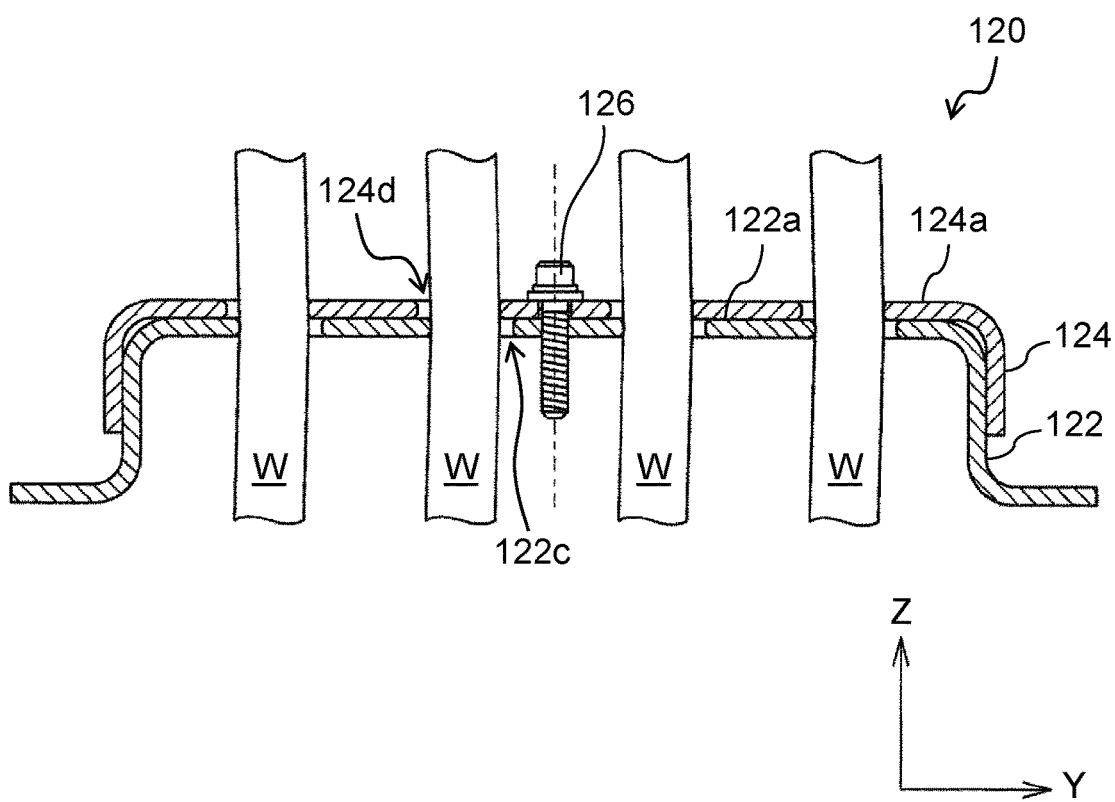
FIG. 12B is a sectional view of the cable holding device in a cable holding state in accordance with another exemplary embodiment.

FIGS. 12A and 12B show sectional views of a cable holding device in accordance with another exemplary embodiment. FIG. 12A shows the cable holding device in a state of releasing cables W, and FIG. 12B shows the cable holding device in a state of holding cables W.

As shown in FIGS. 12A and 12B, cable holding device 120 in accordance with the present exemplary embodiment has base member 122 (a first member) having a convex shape, cap-like slide member 124 (a second member) slidably engaged with base member 122, and fixing screw 126 (a fixing member) which moves slide member 124 relative to base member 122 and fixes slide member 124 to base member 122.

Base member 122 has a plurality of through holes 122c penetrating the base member in the extending direction of cables W (the Z-axis direction).

Slide member 124 is supported on base member 122 so as to be movable by sliding in the penetrating direction of through holes 122c on base member 122 (the Z-axis direction). Slide member 124 also has a plurality of through holes 124d penetrating in the same direction. A through hole 124d on slide member 124 partially overlaps a through hole 122c on base member 122 when they are viewed in the penetrating direction.

Also, as shown in FIGS. 12A and 12B, a screw through hole through which fixing screw 126 is inserted is formed on top plate 124a of slide member 124, and a female threaded hole with which fixing screw 126 engages (is screwed) is formed on top plate 122a of base member 122. Fixing screw 126 may be rotated to cause slide member 124 to slide (parallelly move) relative to base member 122 in the sliding direction (the Z-axis direction) between a "cable clamp releasing position" and a "cable clamping position" and to be fixed at either one of these positions.

According to cable holding device 120 configured like this, each cable W is released when slide member 124 moves away from base member 122 in the penetrating direction of through hole 122c on base member 122 (the Z-axis direction) as shown in FIG. 12A. That is, cable holding device 120 is made to be in a state in which each cable W can move through a through hole 122c on base member 122 and a through hole 124d on slide member 124.

On the other hand, each cable W is clamped in approximately its radial direction (the Y-axis direction) by the inner periphery of through hole 122c on base member 122 and the inner periphery of through hole 124d on slide member 124 when slide member 124 approaches to (comes in contact with) base member 122 as shown in FIG. 12B. As a result, cables W are held by cable holding device 120.

Although slide member 124 is disposed on the +Z-axis direction side of base member 122 in cable holding device 120, the slide member may be disposed inside the recessed portion of the base member (on the −Z-axis direction side). In this case, the cable holding device may be modified such that a screw through hole is provided on the top plate of the base member and a female threaded hole is provided on the top plate of the slide member to allow the base member and the slide member to approach to or move away from each other in the penetrating direction of the through holes (the Z-axis direction) by a rotation of a fixing screw.

As described above, the cable holding device in accordance with the present disclosure can be embodied in various manners. That is, a cable holding device in accordance with an exemplary embodiment of the present disclosure is, in its broad sense, a cable holding device for holding a cable, and comprises: a first member that has a first through hole through which the cable is to pass; a second member that has a second through hole through which the cable is to pass; and a fixing member that fixes the second member to the first member in such a condition that the second through hole partially overlaps the first through hole to hold the cable by an inner periphery of the first through hole and an inner periphery of the second through hole.

The cable holding device in each of the above-described exemplary embodiments is used to hold a plurality of cables extending from the inside to the outside of a pressure-tight case. However, the cable holding device of the present disclosure is not limited to this use.

In the above description, exemplary embodiments have been described as examples of techniques according to the present disclosure. For the purpose of the description, the accompanying drawings and the detailed description have been provided. Accordingly, the components shown in the drawings and described in the detailed description may include not only components that are essential to solve the problems, but also components that are for exemplifying the above-described techniques and thus are not essential to solve the problems. Therefore, it should not be immediately recognized that such non-essential components are essential merely for the reason that they are shown in the drawings or described in the detailed description.

Also, since the above-described exemplary embodiments are for exemplifying the techniques according to the present disclosure, various modifications, substitutions, additions or omissions may be made within the scope of the appended claims and equivalents thereof.

INDUSTRIAL APPLICABILITY

The present disclosure is applicable to a device that has at least one cable which requires a condition in which its movement in both a radial direction and an extending direction is restricted.

What is claimed is:
1. A cable holding device for holding a cable, comprising:
a first member that has a first through hole through which the cable is to pass;
a second member that has a second through hole through which the cable is to pass; and
a fixing screw that fixes the second member to the first member in such a condition that the second through hole partially overlaps the first through hole to hold the cable by an inner periphery of the first through hole and an inner periphery of the second through hole,
wherein the second member is moved relative to the first member by a rotation of the fixing screw,
wherein the first member comprises a guide tab,
wherein the second member comprises a slide lever,
wherein the guide tab and the slide lever each extend in an axial direction of the cable, and wherein a screw through hole through which the fixing screw is to pass is formed in one of the guide tab of the first member and the slide lever of the second member, and a female threaded hole, which is to engage with the fixing screw, is formed in another of the guide tab of the first member and the slide lever of the second member.

2. The cable holding device according to claim 1, wherein the second member is supported on the first member so as to be movable in a direction crossing a penetrating direction of the first through hole.

3. The cable holding device according to claim 1, wherein the second member is supported on the first member so as to be movable in a penetrating direction of the first through hole.

4. The cable holding device according to claim 1, wherein each of opening edges at both ends of the first through hole and opening edges at both ends of the second through hole has a chamfered portion.

5. The cable holding device according to claim 1, wherein a plurality of the first through holes are formed on the first member, and
wherein a plurality of the second through holes are formed on the second member, where a number of the second through holes is the same as a number of the first through holes.

* * * * *